Dec. 26, 1967  J. R. CROSSAN  3,359,676
FISH LINE SINKER
Filed Sept. 8, 1965

INVENTOR.
JESSE R. CROSSAN
BY *Jesse R. Crossan*
ATTY.

United States Patent Office 3,359,676
Patented Dec. 26, 1967

3,359,676
FISH LINE SINKER
Jesse R. Crossan, 345 Highland Ave.,
Wadsworth, Ohio 44281
Filed Sept. 8, 1965, Ser. No. 485,725
3 Claims. (Cl. 43—44.97)

This invention is directed to fishing tackle and more particularly to a novel line sinker adapted to prevent the sinker from becoming stuck or firmly fixed to rocks, brush or other objects it may come into contact with when the sinker is in operation.

It is a common experience of fishermen when still fishing with baited hook to have the heretofore known line sinkers to become snagged on tree branches or rocks. This is particularly true when a fisherman casts a baited hook some distance, allows it to settle to the bottom and then drags it back which is a common practice with many fisherman. However the same experience of line sinkers getting snagged results to a somewhat lesser degree when the line sinker is not dragged but is drawn into contact with brush or stones. Such snagging as just referred to often results in loss of tackle, causes delay and often fish are disturbed by the fisherman's efforts to free the snagged line sinker all of which is well known to fishermen.

It is an object of the present invention to provide a fish line sinker so shaped that it automatically avoids or greatly reduces the chance of it becoming snagged.

Another object of the present invention is to provide a fish line sinker that avoids snagging thereof to an extent that it makes it practical for a fisherman to fish, with baited hook, among rocks and brush of such nature that has been impractical with prior fish line sinkers.

Other advantages of the invention will be apparent to those familiar with the art from the following description and by reference to the drawing wherein.

Figure 2:
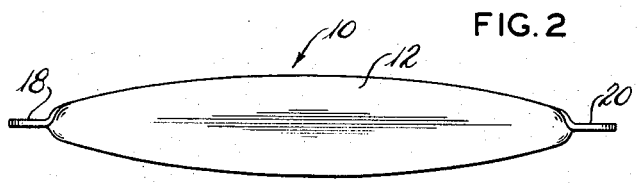
FIG. 2 is a plan view of the sinker of FIG. 1.
Figure 3:
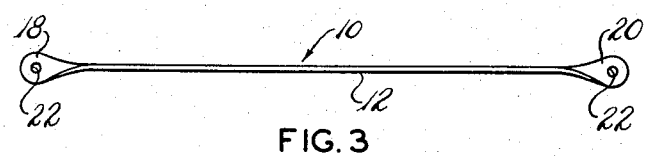
FIG. 3 is a side elevation of the sinker of FIG. 2.

Referring first to FIGS. 2 and 3, it will be seen that the improved sinker 10 has a body 12 of flat elongated shape. It is to be understood that preferably the body is composed of lead and stamped from a sheet of lead 1/16" thick. Also preferably the sides of the sinker are slightly curved as illustrated but the sides may be straight the greatest length of the body of the sinker and then taper to its ends. In any event the sinker terminates in a generally pointed end having a radius of approximately 5/64" as will be understood by reference to the drawing.

Figure 4:
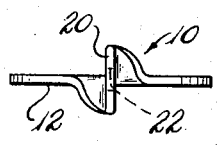
FIG. 4 is a right end elevation of FIG. 3 drawn to an enlarged scale.
Figure 5:
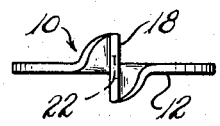
FIG. 5 is a left end elevation of FIG. 3 also drawn to an enlarged scale.

If the body 12 is stamped from a flat sheet of lead as preferred both pointed ends are then twisted 90° which may be conveniently done manually using pliers. The twist involves the body approximately 3/8" back from the end thereof or about three times the radius of the curved end. The ends of body 12 are twisted in opposite directions that is one right and the opposite end left, simulating a right and left hand thread (see FIGS. 4 and 5).

Figure 1:
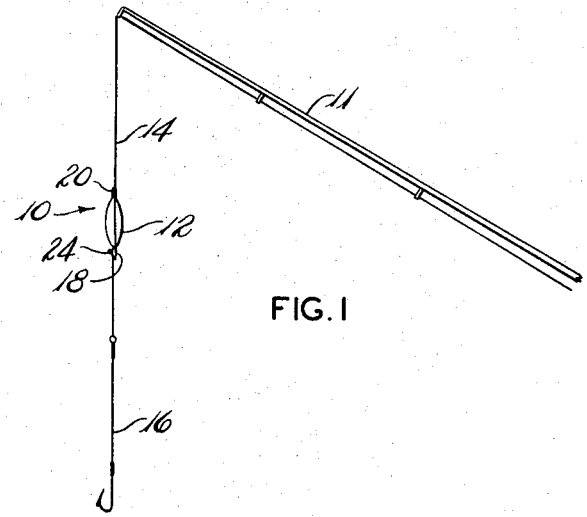
FIG. 1 is a view showing the fish line sinker of the present invention attached to a fish line.

Twisted end 18 and 20 of the sinker has holes 22 adapted to have a fish line 14 threaded therethrough (see FIG. 1).

Obviously the body 12 can be formed in various ways such as by molding or machining and metals other than lead will be found to be satisfactory for body 12.

Operation

Sinker 10 is installed on a fish line as shown in FIG. 1 by threading the line through hole 22 in end 20 and then hole 22 in end 18 after which a hook 16 having a leader, not identified, is tied to the end of line 14. The sinker usually is permitted to slide down or along the line until it is stopped by the leader, however if a fisherman desires to locate the sinker a greater distance from the hook 16 he simply makes a knot 24 below the sinker as illustrated in FIG. 1 at a desired distance from the hook and the sinker will remain in contact with the knot.

When the end 20 of sinker 10 is drawn into contact with a stone or brush or a crotch formed by such, the twisted end imparts a spiral movement to the body to an extent that presents an edge of the body to crotch or surface of the stone or brush. The body 12 being thin and the edge free of projections the sinker readily passes the object it has contacted. For example, applicant has found that a sinker as described and illustrated when mounted on a fish line may readily be drawn through the tines of a table fork.

It is to be understood that the invention contemplates omitting twisting of the end 18, that is the trailing end of the sinker (see FIG. 1). Twist in the trailing end being an opposite twist to that in the leading end 20 functions to counter any tendency of the leading end to cause the sinker to rotate and twist the line when the sinker is drawn rapidly through water or is in a strong current of water.

The twist in end 18 is opposite to that of leading end 20 and any tendency of the leading end twist to cause the sinker to rotate and twist line 16 would be off-set by the twist in end 18 which would equally tend to turn the sinker in an opposite direction. It has been found that in practice the sinker as described with but the leading end 20 twisted does not impart objectional twist to the line unless in extremely swift water or drawn very rapidly through water.

Having described my invention what I claim is:

1. A fish line sinker comprising, a thin elongated body portion having generally pointed ends, each said end for a short distance relative to the length of said body being in the form of a spiral, said body intermediate its spiral portions being thin and having parallel flat surfaces, the tips of the spiralled ends having substantially flat sides in a plane normal to the flat surfaces of the body, the spiral portion of said ends being spiralled in opposite directions to each other, each tip of the body being provided with a hole adapted to receive a fish line whereby the sinker is mounted thereon.

2. A fish line sinker comprising, an elongated thin relatively flat body having smooth edges, said body having end portions and at least one of its end portions tapered and terminating in a curved outline of small radius, said tapered end portion being twisted approximately 90° from the plane of the body portion in an area spaced inwardly from the tip extremity a distance about three times said small radius thereby forming a spiralled end portion of short length, each of said end portions being provided with a small hole through which the fish line may be threaded.

3. A fish line sinker comprising, an elongated thin relatively flat body having smooth edges, said body having tapered end portions each terminating in a curved outline of small radius, said tapered end portions being twisted approximately 90° from the plane of the body portion intermediate said end portions thereby forming spiralled end portions of short length, the twist on one end portion being to the right and the twist on the other end portion being to the left, as viewed from the ends, each of said end portions being provided with a small hole through which the fish line may be threaded.

References Cited
UNITED STATES PATENTS

| | | | |
|---|---|---|---|
| 770,858 | 9/1904 | Hornung | 43—42.51 |
| 1,869,305 | 7/1932 | Dockman | 43—43.1 |
| 2,256,346 | 9/1941 | Mathie | 43—42.52 X |
| 2,473,644 | 6/1949 | Groza | 43—43.13 |
| 2,577,549 | 12/1951 | Vice | 43—44.97 |
| 2,778,145 | 1/1957 | Momb | 43—42.51 |

FOREIGN PATENTS 17,440  3/1908  Norway.

SAMUEL KOREN, *Primary Examiner.*